US010185651B2

(12) United States Patent
Mangalore

(10) Patent No.: US 10,185,651 B2
(45) Date of Patent: Jan. 22, 2019

(54) RELOCATING A VIRTUAL ADDRESS IN A PERSISTENT MEMORY

(71) Applicant: Hewlett Packard Enterprise Development LP, Houston, TX (US)

(72) Inventor: Pramod Kumar Mangalore, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 195 days.

(21) Appl. No.: 15/302,084

(22) PCT Filed: Jul. 10, 2014

(86) PCT No.: PCT/US2014/046173
§ 371 (c)(1),
(2) Date: Oct. 5, 2016

(87) PCT Pub. No.: WO2015/156830
PCT Pub. Date: Oct. 15, 2015

(65) Prior Publication Data
US 2017/0153972 A1 Jun. 1, 2017

(30) Foreign Application Priority Data
Apr. 10, 2014 (IN) .......................... 1898/CHE/2014

(51) Int. Cl.
*G06F 12/02* (2006.01)
*G06F 12/06* (2006.01)
(Continued)

(52) U.S. Cl.
CPC .............. *G06F 12/02* (2013.01); *G06F 12/06* (2013.01); *G06F 12/10* (2013.01);
(Continued)

(58) Field of Classification Search
CPC .... G06F 12/10; G06F 2212/657; G06F 12/02; G06F 12/06
See application file for complete search history.

(56) References Cited

U.S. PATENT DOCUMENTS 6,108,761 A    8/2000   Johnson et al.
7,082,509 B2   6/2006   Zimmer et al.
(Continued)

FOREIGN PATENT DOCUMENTS

JP           06175916       6/1994
WO    WO-2008077802    7/2008

OTHER PUBLICATIONS

Carter et al., "Hardware Support for Fast Capability-based Addressing", Proceedings of the 6th International Conference on Architectural Support for Programming Languages and Operating Systems (ASPLOS VI), Nov. 13, 2007, 9 Pgs.
(Continued)

*Primary Examiner* — Reginald G Bragdon
*Assistant Examiner* — Thanh D Vo
(74) *Attorney, Agent, or Firm* — Hewlett Packard Enterprise Patent Department

(57) ABSTRACT

Some examples described herein relate to relocating a virtual address in a persistent memory. An example includes determining whether a base address of a virtual address segment in a persistent memory has changed. In response to the determination that the base address of the virtual address segment has changed, an offset value between the base address of the virtual address segment and a new base address of the virtual address segment is determined. The offset value is used to relocate a virtual address of a primary data structure in the virtual address segment from a present location to a new location in the persistent memory. Then, a present location of a virtual address of an associated data structure of the primary data structure in the virtual address segment is determined. The offset value is used to relocate the virtual address of the associated data structure of the primary data structure from a current location to another location in the persistent memory.

11 Claims, 10 Drawing Sheets

(51) Int. Cl.
    *G06F 12/1027*     (2016.01)
    *G06F 12/10*     (2016.01)
    *G06F 17/30*     (2006.01)

(52) U.S. Cl.
    CPC .... *G06F 12/1027* (2013.01); *G06F 17/30958* (2013.01); *G06F 2212/657* (2013.01)

(56) References Cited

U.S. PATENT DOCUMENTS

| | | |
|---|---|---|
| 7,275,136 B1 | 9/2007 | Chen |
| 7,500,074 B2 | 3/2009 | Cholleti et al. |
| 8,195,916 B2 | 6/2012 | Bassett et al. |
| 2003/0120886 A1* | 6/2003 | Moller .................. G06F 5/065 711/173 |
| 2005/0120080 A1 | 6/2005 | Weinreb et al. |
| 2005/0283585 A1* | 12/2005 | Sexton ................ G06F 11/366 711/171 |
| 2006/0004975 A1 | 1/2006 | Matheny |

OTHER PUBLICATIONS

International Searching Authority, The International Search Report and the Written Opinion, dated Dec. 23, 2014, 11 Pages.

\* cited by examiner

200

| Header Signature |
| --- |
| 202 |
| Segment base virtual address |
| 204 |
| Address of the primary data structure |
| 206 |

| 302 | 304 |
| --- | --- |
| TYPE_LONGWORD | 0 |
| TYPE_QUADWORD | 1 |
| TYPE_32_BIT_POINTER | 2 |
| TYPE_64_BIT_POINTER | 3 |
| TYPE_PMM_DATA_HEAD | 4 |
| TYPE_PMM_DATA | 5 |
| TYPE_PMM_PFN_RANGE | 6 |
| TYPE_PMM_SHARE | 7 |
| TYPE_PMM_ENTRY | 8 |

| char metadata_signature[32] | ~402 |
| struct pmm_data*pmm_data_list | ~404 |
| struct pmm_data*free_pmm_data_list | ~406 |
| struct pmm_pfn_range*pfn_range_list | ~408 |
| struct pmm_pfn_range*free_pmm_pfn_range_list | ~410 |
| struct pmm_share*pmm_share_list | ~412 |
| struct pmm_share*free_pmm_share_list | ~414 |
| void*next_free_metadata_va | ~416 |
| void*metadata_start_va | ~418 |

500

RELOCATING A VIRTUAL ADDRESS IN A PERSISTENT MEMORY

BACKGROUND

Operating systems typically use a virtual memory system whereby a physical (hardware) memory is addressed using virtual addresses. When a system component or a process requests access to a physical memory, such requests are generated with a virtual address. This virtual address is then mapped to a physical memory by the operating system. A translation lookaside buffer (TLB) that stores mappings between virtual addresses and physical addresses may be used for this purpose.

BRIEF DESCRIPTION OF THE DRAWINGS

For a better understanding of the solution, embodiments will now be described, purely by way of example, with reference to the accompanying drawings, in which:

FIG. 2 is a diagram of an example virtual address segment header;

FIG. 3 is a table illustrating example data types along with example values assigned to the data types;

DETAILED DESCRIPTION OF THE INVENTION

A "persistent memory" may be defined as a memory system that does not lose state on power failure. In other words, it is a non-volatile memory whose content is persistent across an operating system reboot. Persistent memory may he byte addressable. A "data structure" may be defined as a method of storing and organizing data in a computer. In an example, a data structure may be an organized collection of data elements. A "primary data structure" may be defined as a data structure that is created without the use of other data structures.

As mentioned earlier, an operating system may use a translation lookaside buffer (TLB) or a page table to store and translate a mapping between a virtual address and a physical memory address. If these translations are not changed across a reboot or power failure of a system i.e. if a virtual address maps to the same physical address across a reboot or power failure of a system, there may not be an issue related to a later translation. However, in case these translations are changed, it means that a physical address may be mapped to a different virtual address. Also, in such cases, there may be pointers in a memory system that may refer to old virtual addresses. In such an event, these old virtual addresses may need to be relocated so that they are valid in a memory system.

The present disclosure describes relocation of a virtual address in a persistent memory. In an example, a determination may be made whether a base address of a virtual address segment in a persistent memory has changed. In response to the determination, an offset value between the base address of the virtual address segment and a new base address of the virtual address segment may be determined. The offset value may be used to relocate the address of a data structure from its present location to a new location in the virtual address segment. In an example, the present location of the address of a data structure in the virtual address segment may be determined from a descriptor structure corresponding to the data structure.

Figure 1:
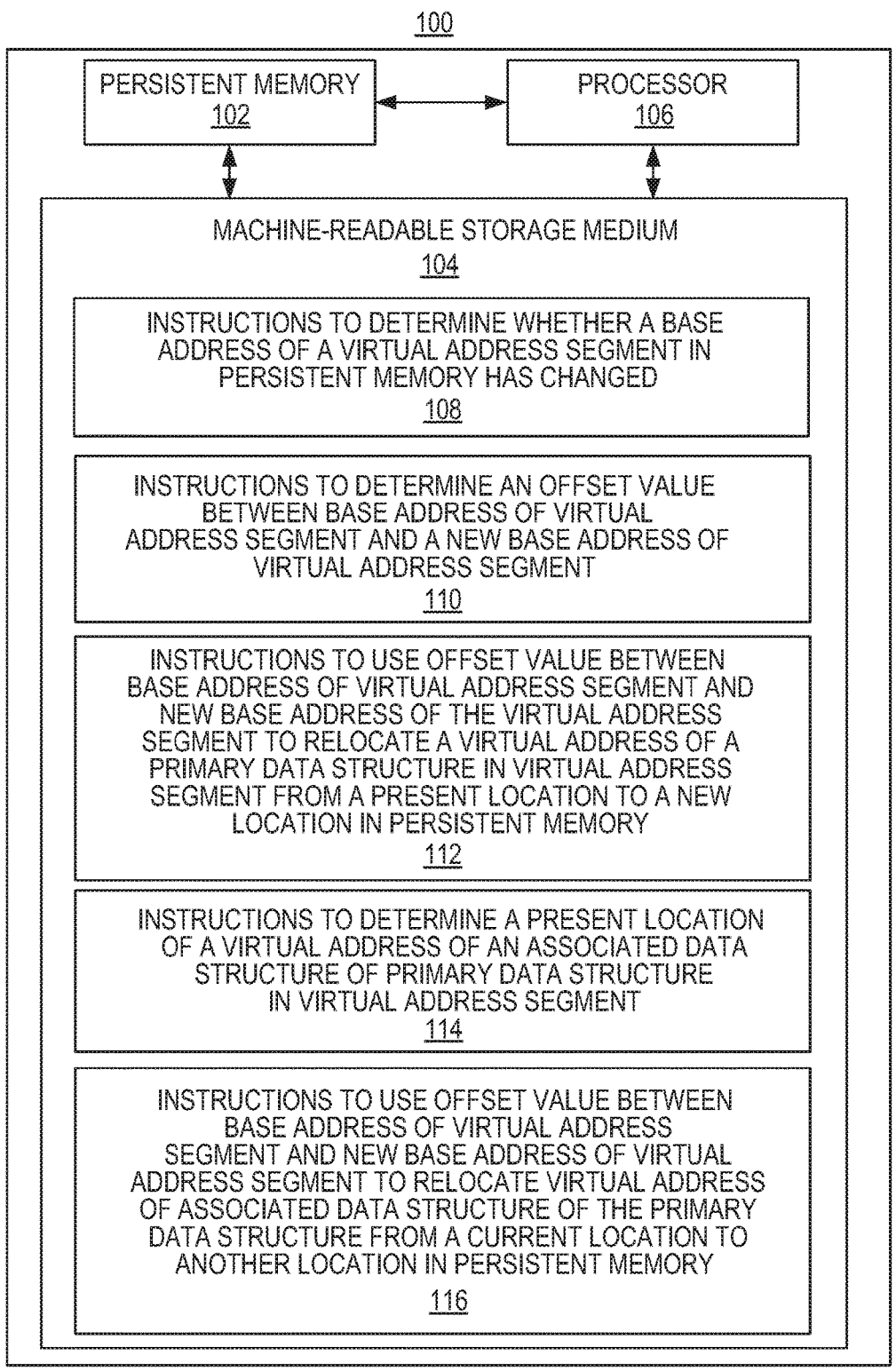
FIG. 1 is a block diagram of an example system that facilitates relocation of a virtual address in a persistent memory.

FIG. 1 is a block diagram of an example system that facilitates relocation of a virtual address in a persistent memory. System 100 may include a persistent memory 102, a machine-readable storage medium 104, and a processor 106. The aforesaid components of system 100 may be communicatively coupled through a system bus (not shown).

System 100 may be a computing device such as a desktop computer, a notebook computer, a tablet computer, a mobile phone, personal digital assistant (FDA), a server, and the like.

Persistent memory 102, as defined above, may be a memory system that does not lose state on power failure. It is a non-volatile memory whose content remains persistent across an operating system reboot. In an example, persistent memory may be divided into virtual address segments. A virtual address segment may include two parts: a virtual address segment header and a virtual address segment data. An example virtual address segment header is illustrated in FIG. 2. A virtual address segment header 200 may include three components: a header signature 202, a segment base virtual address 204, and an address of the primary data structure 206. A primary data structure may be associated or linked with other associated data structures in a virtual address segment. Some non-limiting examples of a primary data structure may include a singly linked list structure, a doubly linked list structure, and structures storing pointers to more than one structure. A virtual address segment may include a base address. Further, a virtual address may include one or more virtual addresses. A virtual address may include two parts: a virtual address page number and a virtual address page offset.

Figures 4, 5:
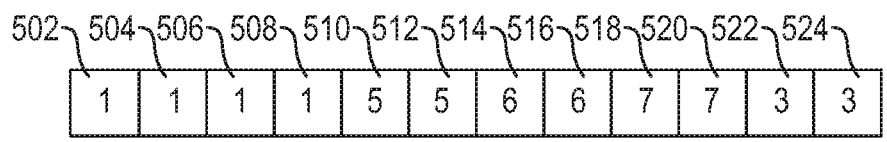
FIG. 4 illustrates an example data structure.
FIG. 5 illustrates an example descriptor structure.

In an example, a data structure in a virtual address segment may be represented by using a descriptor structure. A data structure may include one or more data types. A descriptor structure for a data structure includes a set of unique values that may be assigned to each of the data types present in the data structure. The sequence of these values in a descriptor structure may correspond with the sequence of the data types present in a data structure. Thus, a descriptor structure may be regarded as a group of values wherein a value or a set of values may refer to a unique data type of a data structure. FIG. 3 illustrates a table 300 displaying example data types along with example values assigned to the data types. For example, in table 300, the data type "TYPE_LONGWOOD" 302 is assigned a unique value "0" (304). Based on such classification, a descriptor structure may be created for each data structure in a virtual address segment. FIG. 4 illustrates an example data structure 400 stored in a virtual address segment. In the example of FIG.

4, the data structure 400 includes multiple data types 402-418. For instance, char metadata_signature [32] 402 is an example data type. In an example, the data structure 400 of FIG. 4 may be represented by a descriptor structure. An example descriptor structure 500 representing the data structure of FIG. 4 is illustrated in FIG. 5. The example descriptor structure includes unique values (502-524) representing various data types of the data structure 400 of FIG. 4. In an example, the aforesaid values may be used to identify the location of a virtual address stored in a virtual address segment. Whenever a base address of a virtual address segment is changed, descriptor structures may be read to identify the fields storing the pointers inside the structure. In an example, a static descriptor structure for each data structure present in a persistent memory may be stored in the form of machine-readable instructions on a machine-readable storage medium.

Machine-readable storage medium 104 may be a random access memory (RAM) or another type of dynamic storage device that may store information and machine-readable instructions that may be executed by processor. For example, machine-readable storage medium may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. In the example of FIG. 1, machine-readable storage medium store machine-readable instructions 108, 110, 112, 114, and 116. In an example, machine-readable storage medium 104 may be present external to system 100 and may communicate with system 100 via a communication interface.

Processor 106 may be any type of Central Processing Unit (CPU), microprocessor, or processing logic that interprets and executes machine-readable instructions stored in machine-readable storage medium.

In the example of FIG. 1, instructions 108 may be executed by processor 106 to determine whether a base address of a virtual address segment in persistent memory 102 has changed. In an example, aforesaid determination may be made by instructions 106 while allocating a virtual address segment in persistent memory 102. In an example, in order to determine whether the base address of the virtual address segment has changed instructions 108 may compare the base address of the virtual address segment with a new base address of the virtual address segment. A new base address may be assigned to a virtual address segment during its allocation in persistent memory 102. In an example, a base address present in the header portion of the virtual address segment may be compared with the new base address of the virtual address segment to determine whether the base address of the virtual address segment has changed.

In response to the determination that the base address of the virtual address segment has changed, instructions 110 may determine an offset value between the base address of the virtual address segment and a new base address of the virtual address segment. To provide an illustration, in case a virtual address segment with base address Base VAx (segment x) is relocated to another virtual address segment with base address Base VAy (segment y), the offset value between the Base VAx and Base VAy may be calculated by using the following equations:

$$\text{Address related to Base } VAy = \text{Base } VAy + \text{offset} \quad (i)$$

$$\text{Offset} = \text{Base } VAy - \text{Base } VAx \quad (ii)$$

Instructions 112 may use the offset value between the base address of the virtual address segment and the new base address of the virtual address segment to relocate a virtual address of a primary data structure in the virtual address segment from its present location to a new location in the persistent memory. In an example, a present location of the virtual address of the primary data structure is obtained from a header portion of the virtual address segment.

Instructions 114 may determine a present location of a virtual address of an associated data structure of the primary data structure in the virtual address segment. In an example, aforesaid location may be determined from a descriptor structure corresponding to the associated data structure of the primary data structure in the virtual address segment. The descriptor structure for the associated data structure may include a plurality of values wherein each value or a set of values may represent a unique data type present in the associated data structure.

Once the present location of a virtual address of an associated data structure is known, instructions 116 may use the offset value between the base address of the virtual address segment and the new base address of the virtual address segment to relocate a virtual address of the associated data structure of the primary data structure from its current location to another location in the persistent memory.

Figure 6:
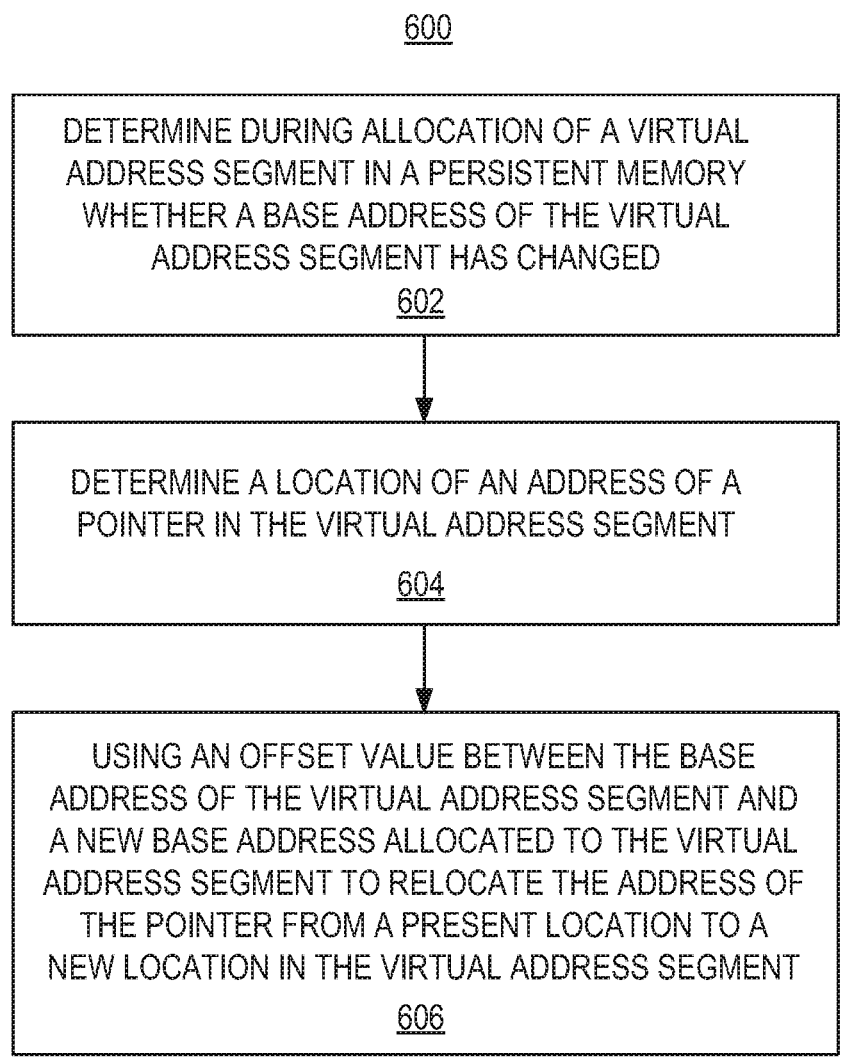
FIG. 6 is a flowchart of an example method for facilitating relocation of a virtual address in a persistent memory.

FIG. 6 is a flowchart of an example method 600 for relocating a virtual address in a persistent memory. The method 600 which is described below may be executed on a computing device such as system 100 of FIG. 1. However, other computing devices may be used as well. At block 602, instructions (example, 108) may determine during allocation of a virtual address segment in a persistent memory whether a base address of the virtual address segment has changed. Said determination may be made by instructions (example, 108) by comparing the base address of the virtual address segment with a new base address of the virtual address segment. In an example, the base address is present in a header portion of the virtual address segment.

Figure 7:
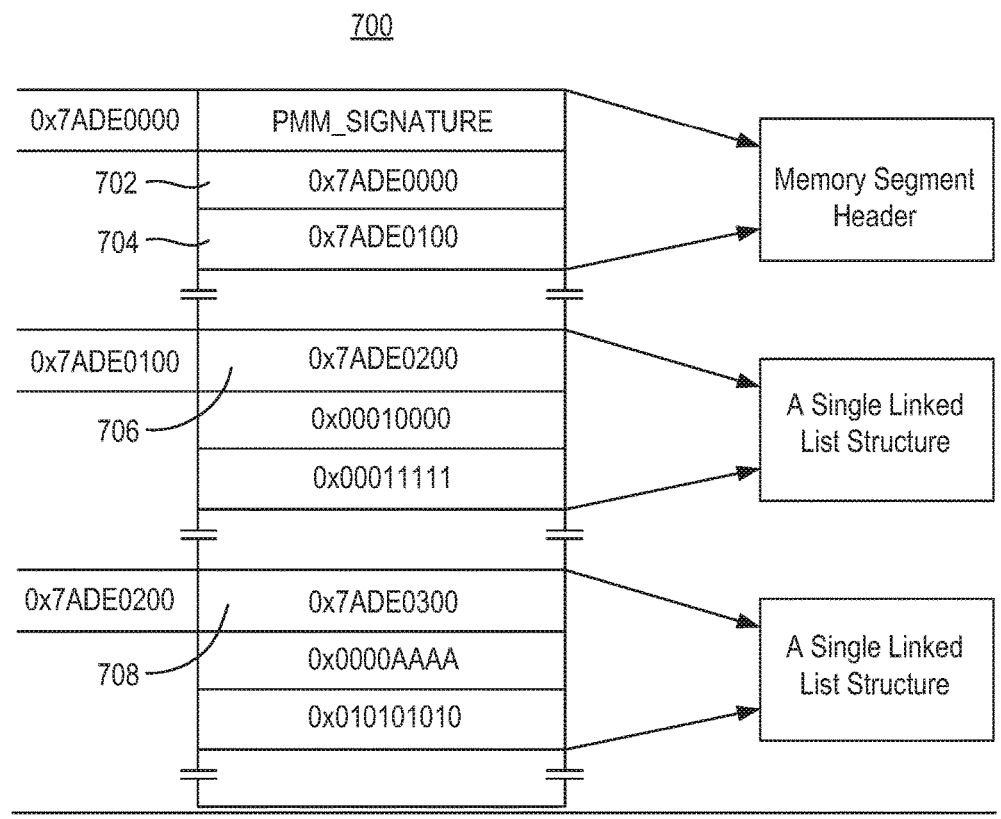
FIG. 7 is a diagram of an example virtual address memory segment with a scattered singly linked list data structure.
Figure 8:
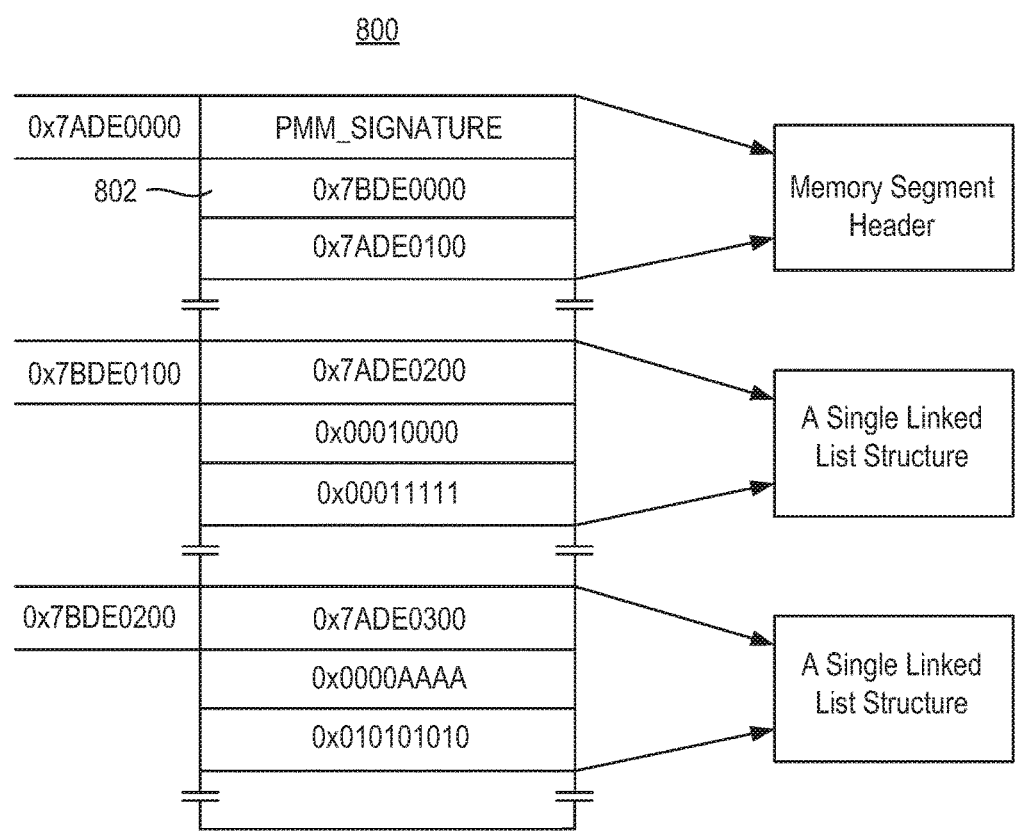
FIG. 8 is a diagram of an example virtual address memory segment of FIG. 7 illustrating a change in the base address.

At block 604, in response to the determination that the base address of the virtual address segment has changed, instructions (example, 110) may determine an offset value between the base address of the virtual address segment and a new base address of the virtual address segment. In an example, said offset value may be determined using the equations (i) and (ii) described for an example mentioned above. To provide an illustration, a reference may be made to FIGS. 7 and 8. FIG. 7 is a diagram of an example virtual address memory segment 700 with a scattered singly linked list data structure. The singly list linked data structure includes three fields (members) 704, 706. 708 scattered in the memory segment. The first field 704 is a pointer to another structure. The second field 706 and the third field 708 are not pointers. In the example of FIG. 7, if the memory segment base address 702 is changed to 0x7BDE0000, offset may be calculated according to the equations (i) and (ii) mentioned above i.e. offset=0x7BDE0000−0x7ADE0000= 0x01000000. Once offset value is calculated, the "old" base address 702 may be changed to the new virtual address base address 802 i.e. 0x7BDE0000. This is illustrated in the virtual address memory segment 800 of FIG. 8.

Figure 9:
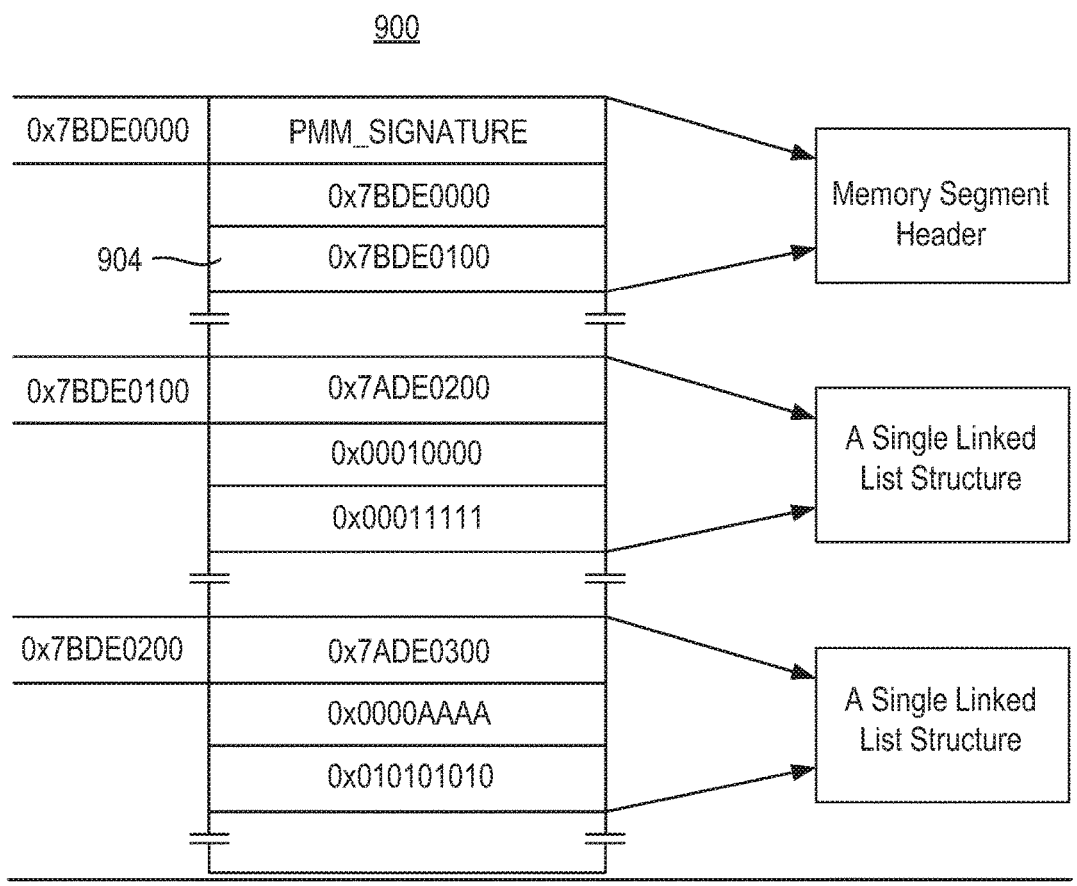
FIG. 9 is a diagram of an example virtual address memory segment of FIG. 7 illustrating relocation of a primary data structure.

At block 606, instructions (example, 112) may use the calculated offset value between the base address of the virtual address segment and a new base address of the virtual address segment to relocate a virtual address of a pointer in the virtual address segment from its present location to a new location in the persistent memory. In an example, a present location of the virtual address of the pointer may be determined from a header portion of the virtual address segment. Referring to the example illustrated in FIGS. 7 and 8, in the present context, the virtual address of a pointer is relocated to a new location 904. This is illustrated in the virtual address memory segment 900 of FIG. 9.

Figure 10:
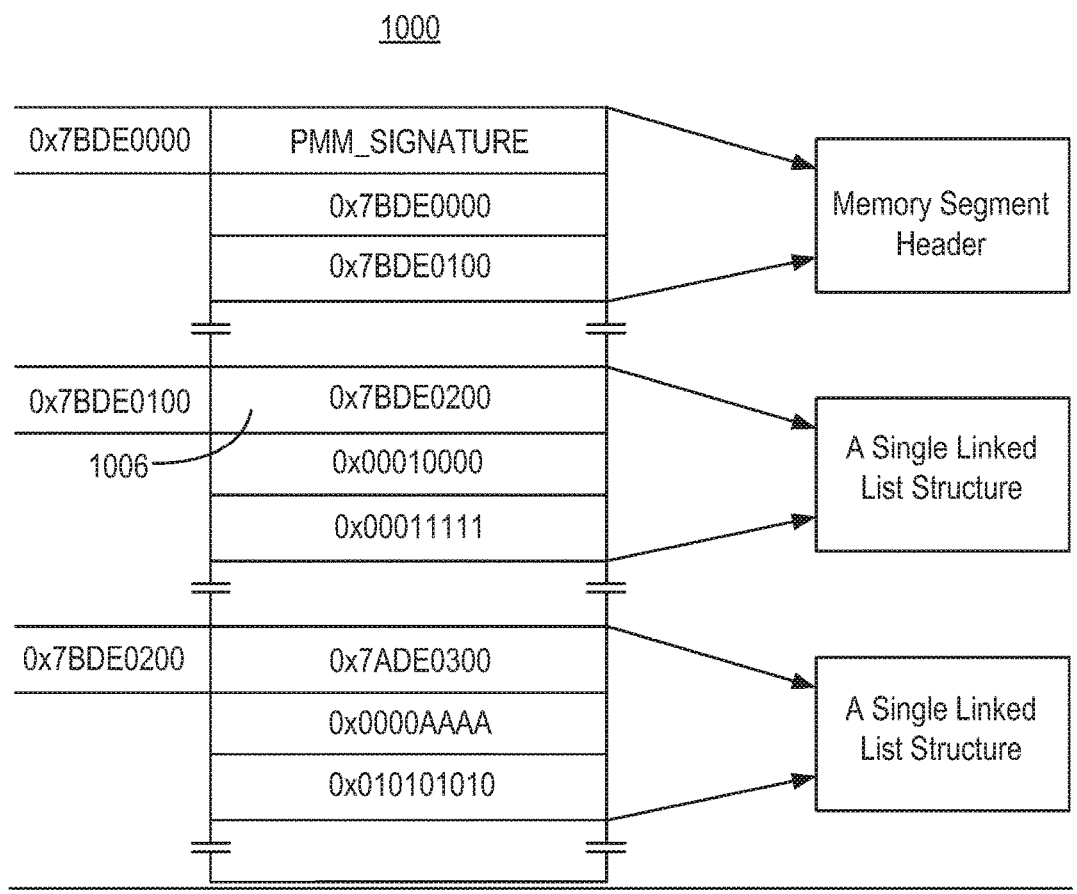
FIG. 10 is a diagram of an example virtual address memory segment of FIG. 7 illustrating relocation of a data structure associated with a primary data structure.
Figure 11:
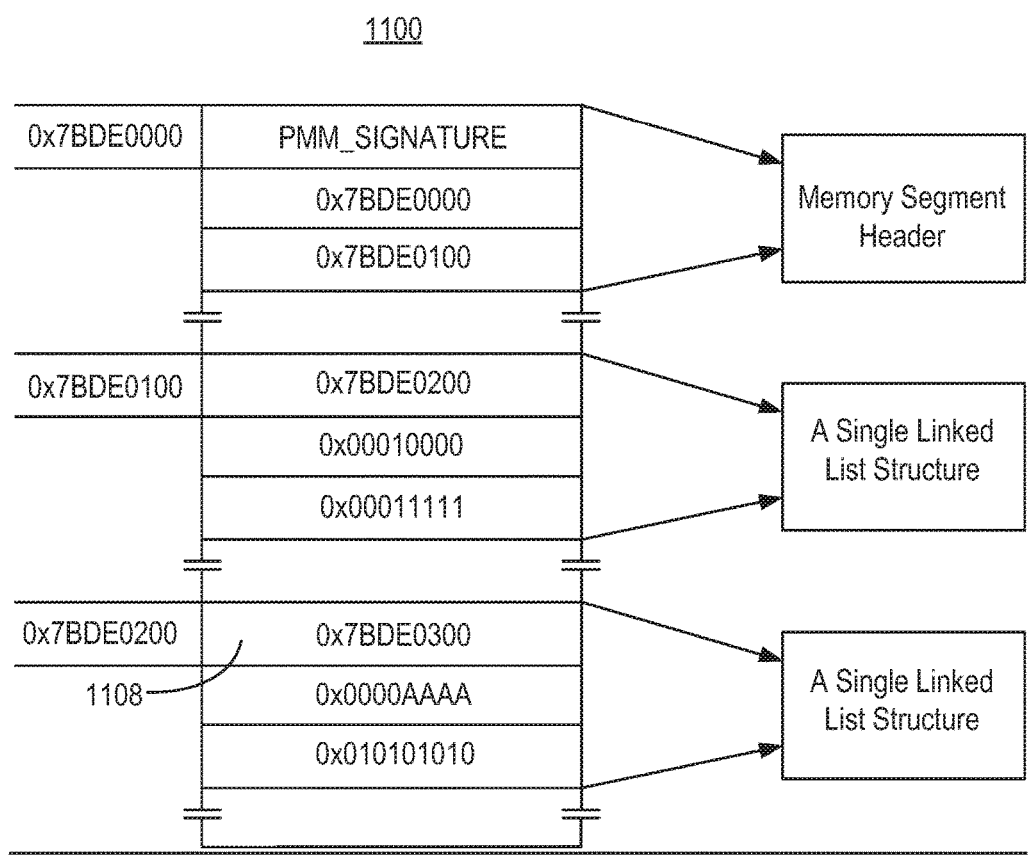
FIG. 11 is a diagram of an example virtual address memory segment of FIG. 7 illustrating relocation of a data structure associated with a primary data structure.

In an example, once the virtual address of a pointer is relocated to a new location, instructions (example, 114) may determine a present location of a virtual address of a data structure pointed to by the pointer in the virtual address segment. In an example, aforesaid location may be determined from a descriptor structure that represents the data structure pointed to by the pointer. As mentioned earlier, a data structure in a persistent memory system may be represented by using a descriptor structure. A descriptor structure for a data structure may include a unique value or a set of values for each of a data type present within a data structure. These values may be analyzed to locate the virtual address of a data structure stored in a virtual address segment. Instructions (example, 116) may then use the offset value between the base address of the virtual address segment and the new base address of the virtual address segment to relocate a virtual address of the data structure pointed to by the pointer from its present location to a new location in the persistent memory. Referring to the example illustrated in FIGS. 7, 8 and 9, in the present context, the virtual address of a data structure pointed to by the pointer (for example, the second member 706) in the virtual address segment is relocated from its present location to another location 1006 in the persistent memory. This is illustrated in the virtual address memory segment 1000 of FIG. 10. Similarly, another data structure pointed to by the pointer (the third member 708) in the virtual address segment is relocated from its present location to another location 1108 in the persistent memory. This is illustrated in the virtual address memory segment 1100 of FIG. 11.

Figure 12:
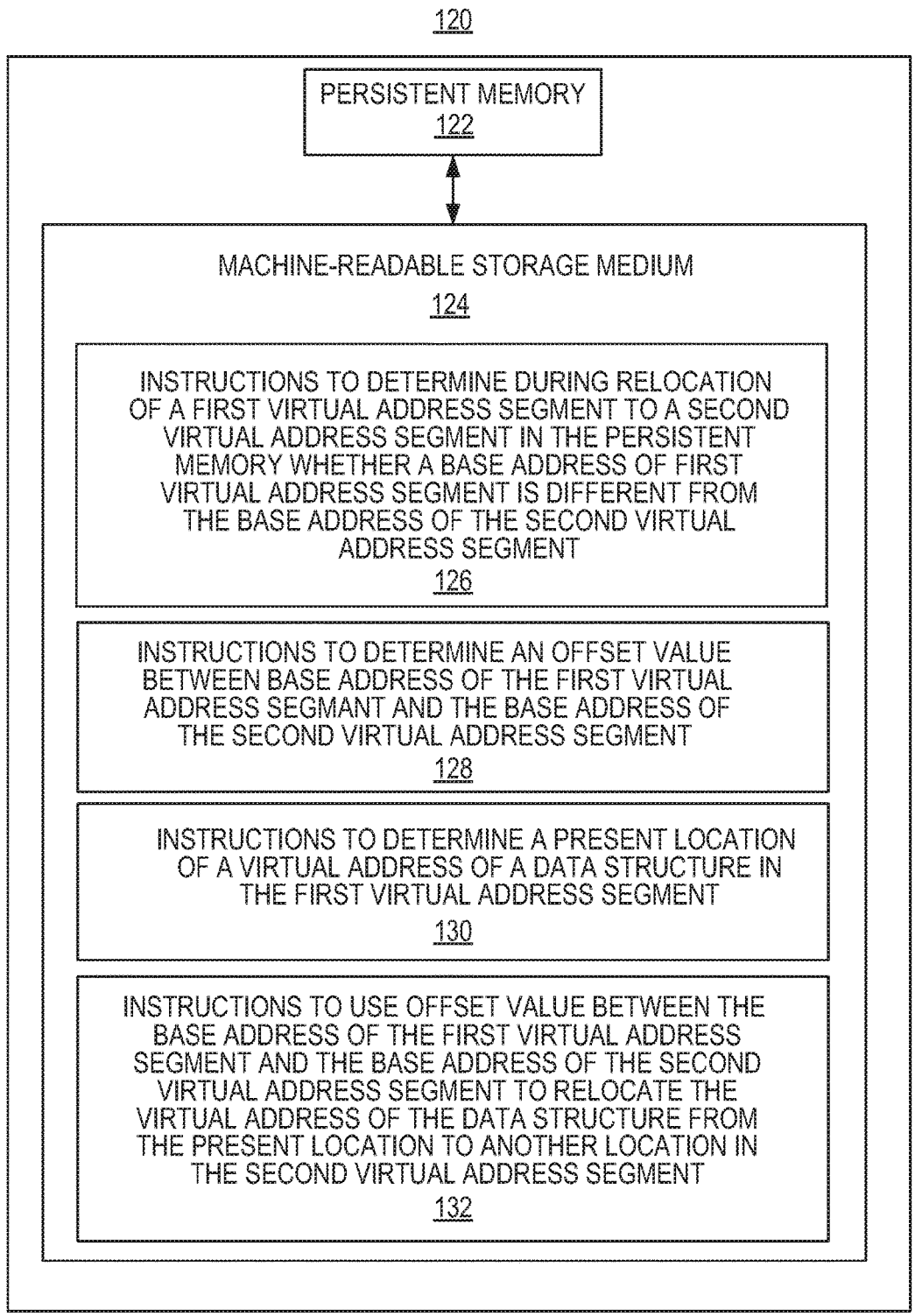
FIG. 12 is a block diagram of an example system that facilitates relocation of a virtual address in a persistent memory.

FIG. 12 is a block diagram of an example system 120 that facilitates relocation of a virtual address in a persistent memory. System may be analogous to system 100, in which like reference numerals correspond to the same or similar, though perhaps, not identical, components. For the sake of brevity, components or reference numerals of FIG. 12 having a same or similarly described function in FIG. 1 are not being described in connection with FIG. 12. Said components or reference numerals may be considered alike.

System 120 may include a persistent memory 122 and a machine-readable storage medium 124. The aforesaid components of system 120 may be communicatively coupled through a system bus (not shown).

System 120 may be a computing device such as a desktop computer, a notebook computer, a tablet computer, a mobile phone, personal digital assistant (PDA), a server, and the like.

Persistent memory 122 may be a memory system that does not lose state on power failure. Persistent memory 122 may be similar to persistent memory described above (example, 102).

Machine-readable storage medium 124 may be a random access memory (RAM) or another type of dynamic storage device that may store information and machine-readable instructions that may be executed by processor. Machine-readable storage medium may be similar to machine-readable storage medium described above. In the example of FIG. 12, machine-readable storage medium may store machine-readable instructions 126, 128, 130, and 132. In an example, machine-readable storage medium may be present external to system 120 and may communicate with system 120 via a communication interface.

In the example of FIG. 12, instructions 126 may determine during relocation of a first virtual address segment to a second virtual address segment in the persistent memory whether a base address of the first virtual address segment is different from a base address of the second virtual address segment. Instructions 126 to determine whether the base address of the first virtual address segment has changed may include instructions to compare the base address of the first virtual address segment with the base address of the second virtual address segment. In an example, a base address present in the header portion of the first virtual address segment may be compared with the base address of the second virtual address segment to determine whether the base address of the first virtual address segment has changed.

In response to the determination that the base address of the first virtual address segment is different from the base address of the second virtual address segment, instructions 128 may determine an offset value between the base address of the first virtual address segment and the base address of the second virtual address segment. In an example, the offset value may be calculated according to the equations (i) and (ii) described above.

Instructions 130 may determine a present location of an address of a data structure in the first virtual address segment. In an example, aforesaid location may be determined from a descriptor structure corresponding to the data structure in the virtual address segment. The descriptor structure for the data structure may include a plurality of values wherein each value or a set of values may represent a unique data type present in the data structure.

Instructions 132 may use the offset value between the base address of the first virtual address segment and the base address of the second virtual address segment to relocate the address of the data structure in the first virtual address from the present location to a new location in the second virtual address segment.

For the purpose of simplicity of explanation, the example method of FIG. 6 is shown as executing serially, however it is to be understood and appreciated that the present and other examples are not limited by the illustrated order. The example systems of FIGS. 1 and 12, and method of FIG. 6 may be implemented in the form of a computer program product including computer-executable instructions, such as program code, which may be run on any suitable computing device in conjunction with a suitable operating system (for example, Microsoft Windows, Linux, UNIX, and the like). Embodiments within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM. ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution.

The invention claimed is:

1. A non-transitory machine-readable storage medium comprising instructions executable by a processor to:
   determine whether a base address of a virtual address segment in a persistent memory has changed;
   in response to the determination that the base address of the virtual address segment has changed, determine an offset value between the base address of the virtual address segment and a new base address of the virtual address segment;
   use the offset value between the base address of the virtual address segment and the new base address of the virtual address segment to relocate a virtual address of a primary data structure in the virtual address segment from a present location to a new location in the persistent memory;
   determine a present location of a virtual address of an associated data structure of the primary data structure in the virtual address segment;
   use the offset value between the base address of the virtual address segment and the new base address of the virtual address segment to relocate the virtual address of the associated data structure of the primary data structure from a current location to another location in the persistent memory; and
   wherein the present location of the virtual address of the associated data structure is determined from a descriptor structure corresponding to the associated data structure, wherein the descriptor structure includes a plurality of values wherein each value or a set of values represents a unique data type present in the associated data structure.

2. The storage medium of claim 1, wherein the base address of the virtual address segment is present in a header portion of the virtual address segment.

3. The storage medium of claim 1, wherein instructions to determine whether the base address of the virtual address segment has changed include instructions to compare the base address of the virtual address segment with the new base address of the virtual address segment.

4. The storage medium of claim 1, wherein the present location of the virtual address of the primary data structure in the virtual address segment is determined from a header portion of the virtual address segment.

5. The storage medium of claim 1, wherein the primary data structure is a pointer.

6. A method, comprising:
   determining during allocation of a virtual address segment in a persistent memory whether a base address of the virtual address segment has changed;
   in response to the determination that the base address of the virtual address segment has changed, determining a location of an address of a pointer in the virtual address segment;
   using an offset value between the base address of the virtual address segment and a new base address allocated to the virtual address segment to relocate the address of the pointer from a present location to a new location in the virtual address segment;
   determining a location of an address of a data structure pointed to by the pointer in the virtual address segment;
   using the offset value between the base address of the virtual address segment and the new base address of the virtual address segment to relocate the address of the data structure pointed to by the pointer from a current location to another location in the virtual address segment; and
   using a descriptor structure corresponding to the data structure pointed to by the pointer, wherein the descriptor structure includes a plurality of values wherein each value or a set of values represents a unique value for each of a data type within the data structure, to determine the current location of the address of the data structure pointed to by the pointer.

7. The method of claim 6, further comprising determining the offset value between the base address of the virtual address segment and the new base address of the virtual address segment.

8. The method of above claim 6, wherein the pointer is a member of a singly linked list structure.

9. A system, comprising:
   a persistent memory;
   a machine-readable storage medium memory communicatively coupled with the persistent memory, wherein the machine-readable storage medium memory includes machine-readable instructions to:
   determine during relocation of a first virtual address segment to a second virtual address segment in the persistent memory whether a base address of the first virtual address segment is different from a base address of the second virtual address segment;
   in response to the determination that the base address of the first virtual address segment is different from the base address of the second virtual address segment, determine an offset value between the base address of the first virtual address segment and the base address of the second virtual address segment;
   determine a present location of a virtual address of a data structure in the first virtual address segment;
   use the offset value between the base address of the first virtual address segment and the base address of the second virtual address segment to relocate the virtual address of the data structure in the first virtual address from the present location to a new location in the second virtual address segment; and
   wherein the present location of the address of the data structure is determined from a descriptor structure corresponding to the data structure, wherein the descriptor structure includes a plurality of values wherein each value or a set of values represents a unique value for each data type present in the data structure.

10. The system of claim 9, wherein the data structure is a doubly linked list structure.

11. The system of claim 9, wherein the persistent memory is part of a random-access memory (RAM).

* * * * *